United States Patent [19]
Baldissarutti

[11] Patent Number: 5,894,336
[45] Date of Patent: Apr. 13, 1999

[54] EYEGLASS-FRAME HINGE

[75] Inventor: Walter Baldissarutti, S. Stefano Di Cadore, Italy

[73] Assignee: G.B. S.r.l., Belluno, Italy

[21] Appl. No.: 08/882,169

[22] Filed: Jun. 25, 1997

[30] Foreign Application Priority Data

Aug. 5, 1996 [IT] Italy ................. BL 960013 U

[51] Int. Cl.⁶ ........................................ G02C 5/22
[52] U.S. Cl. ................................ 351/153; 16/228
[58] Field of Search ................. 351/153, 41, 111, 351/140; 16/228

[56] References Cited

U.S. PATENT DOCUMENTS 1,955,690  4/1934  Spill.
5,732,444  3/1998  Horikawa et al. ............. 351/153

FOREIGN PATENT DOCUMENTS 0 695 962 A1  2/1996  European Pat. Off..
2658231  8/1991  France.
2281979  3/1995  United Kingdom.
96/02014  1/1996  WIPO.

OTHER PUBLICATIONS

Eyewear pp. 72 and 76, Jun. 1998.

*Primary Examiner*—Hung Xuan Dang
*Attorney, Agent, or Firm*—Herbert Dubno; Andrew Wilford

[57] ABSTRACT

Hinge for connecting a shaft (11) to the corresponding end part (A) of a frame (C) for spectacles, in which said end is made of metal wire and folded in the form of at least one first arm (2) and one second arm (3), lying in different planes and splayed with respect to one another, one (3) of said arms having the free end folded so as to form a pin (4) on which there is inserted a cam element (13) fixed to one end (12) of said shaft (11), wherein said cam element (13) has at least two adjacent surfaces (13a, 13b) substantially perpendicular to one another and defining at least one first corner (13c) and at least one second corner (13d), said surfaces (13a, 13b) and corners (13c, 13d) acting in sequence on said pin and on said first arm (2) of the end (A) of the support frame (C) of the spectacles so as to cause an elastic recall reaction on said pin (4) both during opening/closing of the shaft and in the event of forced splaying from the open position thereof.

10 Claims, 1 Drawing Sheet

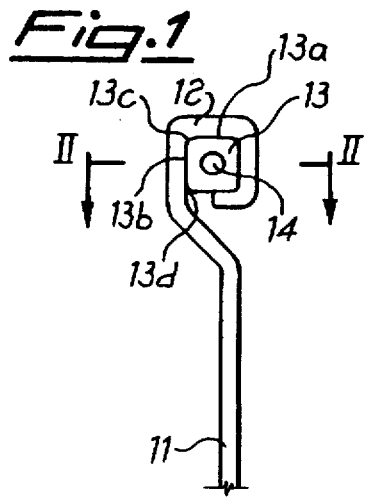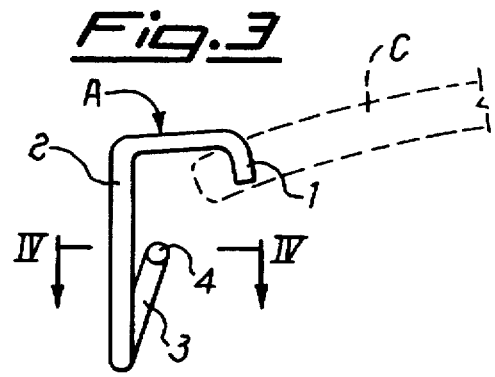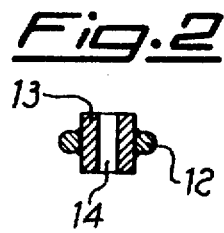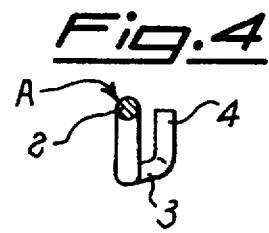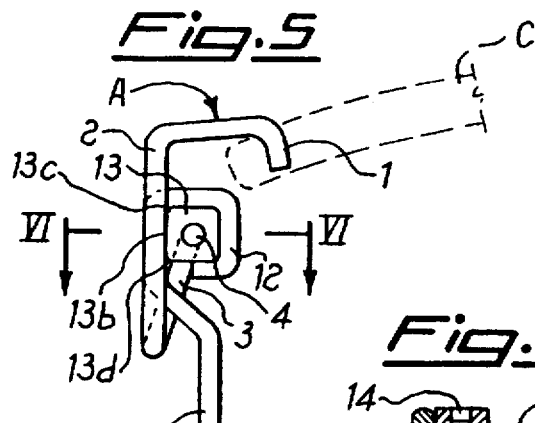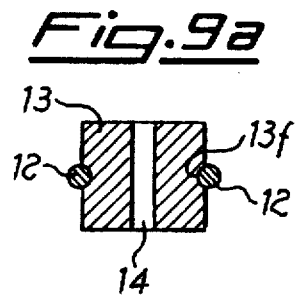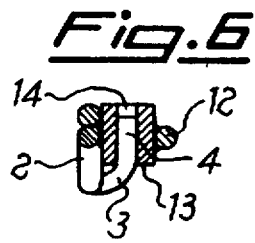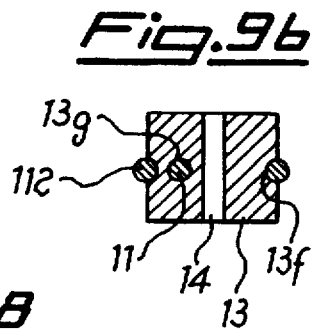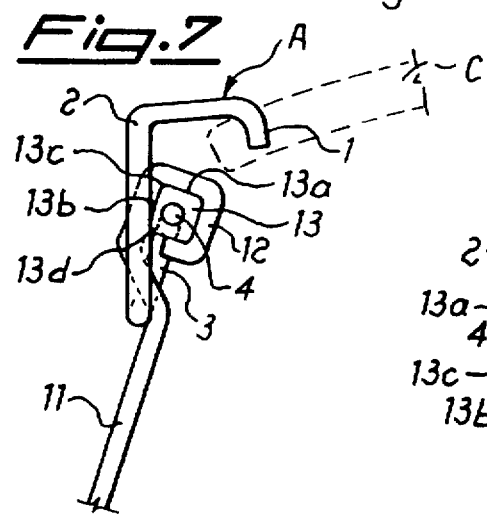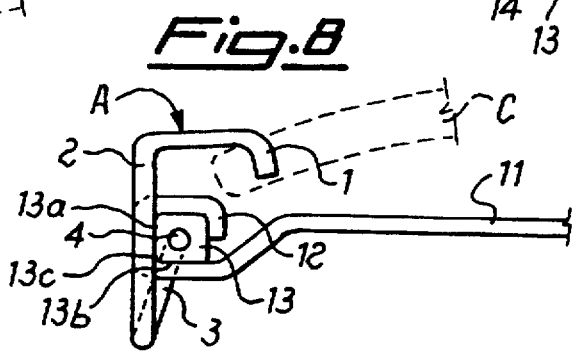

EYEGLASS-FRAME HINGE

FILED OF THE INVENTION

1. Description

The present invention relates to a hinge for connecting a shaft to a frame for spectacles, which has a cam insert provided with at least two substantially perpendicular surfaces and at least two corners acting in sequence on one end of said frame so as to produce an elastic recall effect of the shaft both during opening/closing of the shaft and in the event of forced splaying from the open position thereof.

2. Background of the Invention

It is known in the technical sector relating to the production of frames for spectacles, of the need to hinge at the opposite ends of the frame supporting the lenses a shaft resting on the ears of the user.

It is also known that a particular form of hinge used for this connection is made of metal wire both in the part fixed to the lens support frame and in the end of the shaft to be joined to the frame itself.

More particularly, in said type of known hinge, a portion of suitably folded metal wire has a first end soldered or in any case fixed to the lens support frame or to the lens itself and a second end folded so as to form a pin for engaging and hinging the associated shaft, which is in turn made of metal wire and, at the end for hinging on the frame, has an eyelet or more advantageously an axially holed cylinder which is soldered or fixed to the eyelet of the shaft.

According to the current art, in this type of hinge for spectacles, the end pin of the wire of the support frame is inserted, with a slight forcing action, into the hole of the eyelet or the cylinder arranged at the end of the shaft, so that the suitably shaped portion of metal wire mounted on the frame enters into engagement with the cylinder or with the eyelet of the shaft, ensuring hinging thereof and preventing disengaging thereof.

While offering undisputed advantages in terms of low production costs, as well as rapid assembly and simple operation, this hinge, however, has the drawback that it does not possess any elasticity during splaying of the shaft beyond the normal opening angle, which elasticity, however, is required in order to prevent deformation and/or breakage in the event of forcing, as well as cause pre-stressing thereof, representing the pressure with which the shaft presses against the user's temple.

In addition to this, the lack of elasticity of the hinge does not provide the shaft with any stability both in the open position for use and in the position involving folding thereof in order to put the spectacles back in their case.

OBJECTS OF THE INVENTION

The technical problem which is posed, therefore, is that of providing a hinge for connecting a lens support frame of spectacles and the associated shaft, both of which are made with a metal wire, which hinge is designed to exert a suitable recall reaction on the shaft in the event of forced splaying of the latter with respect to the normal angle of use.

Within the scope of this problem a further need is that said hinge should be designed to provide a snap action which favours opening/closing of the shaft from/into the normal closed position in addition to keeping the shaft stable both in the closed position and in the open position.

SUMMARY OF THE INVENTION

These objects are achieved according to the invention in a hinge for connecting an eyeglass front frame to a temple shaft that has an elastically deformable wire having a pair of arms extending at an acute angle to each other from an apex, one of the arms having an outer end fixed to the front frame and the other of the arms having an outer end bent to form a pivot pin extending crosswise to and adjacent the one arm. A cam element fixed on the temple shaft and pivoted on the pivot pin has a pair of generally perpendicular surfaces engageable with the one arm and forming a pair of corners, one of the surfaces lying flatly against the one arm in a closed position with the temple extending generally parallel to the front frame and the other of the surfaces lying flatly against the one arm in an open position with the temple extending transversely from the front frame. Thus the corners cam the two arms elastically apart on displacement from the open and closed positions.

BRIEF DESCRIPTION OF THE DRAWINGS

Further details may be obtained from the following description of a non-limiting example of embodiment of the invention, provided with reference to the accompanying illustrative plates, in which:

FIG. 1 shows a plan view of the shaft carrying the cam element according to the invention;

FIG. 2 shows a cross-sectional view of the shaft, along the section II—II of FIG. 1;

FIG. 3 shows a plan view of the portion of the metal wire mounted on the frame of the spectacles, folded so as to form the hinging end;

FIG. 4 shows a cross-sectional view of the hinging end, along the section IV—IV of FIG. 3;

FIG. 5 shows a plan view of the shaft according to FIG. 1, hinged at the end of FIG. 3, shown in a normally open position with respect to the frame;

FIG. 6 shows a cross-sectional view of the shaft hinged at the end, along the section VI—VI of FIG. 5;

FIG. 7 shows a plan view of the hinged shaft, as in FIG. 5, but shown in the maximum splayed position;

FIG. 8 shows a plan view of the hinged shaft, as in FIG. 5, but shown in the closed position; and FIGS. 9a, 9b: show two partially sectioned views of variations of embodiments of the connection between shaft and insert respectively.

SPECIFIC DESCRIPTION

In all the figures the same details are indicated, or understood as being indicated, by the same reference numbers.

As already mentioned, ends A of front frames C of spectacles are known, which ends are formed by a portion of metal wire, one end 1 of which is soldered or fixed to the said front frame C, in a suitable position. Said portion has two sections 2 and 3, arranged relative to one another approximately in the form of a "V", the arms of which lie in different planes. The free end of the section 3 is folded so as to form a vertical pin 4 forming the axis of rotation of the shaft 11 to be mounted.

The shaft 11 has the end for hinging on the frame in the form of an eyelet 12, which encloses a quadrangular insert 13 with an axial central hole 14.

Said insert has two adjacent surfaces 13a, 13b intersecting at a corner 13c, and a second corner 13d, and in its entirety forms a cam element, operation of which will emerge more clearly below.

As shown in FIGS. 5 and 8, association and hinging of the shaft 11 with the pin 4 is easily achieved by positioning the hole 14 of the insert 13 above the pin 4 of the end A and exerting a slight pressure so that the pin 4 is seated in the hole 14.

From the same FIGS. 5 and 8, it can be seen how the horizontal side 2 of the end A of the frame C alternately makes contact with one of the two adjacent sides 13a, 13b of the quadrangular insert 13, ensuring stability of the shaft 11 in both the normally open or closed positions.

With reference to FIG. 7, it is obvious that forced splaying of the shaft 11 tends to cause the diagonal of the two adjacent sides of the body 13 to be arranged alongside the side 2 of the end A, with consequent forcing of the structure A, splaying of the sides 2 and 3, due to the thrusting action exerted by the corner 13d of the insert 13, and consequent displacement of the pin 4.

The tension existing between the two V-shaped parts 2 and 3 of the end A results in an elastic reaction on the pin 4, which tends to retract and rotate the insert 13 so as to cause the shaft 11 to return to its normally open position, as shown in FIG. 5. This reaction constitutes the pressure exerted on the temples, so as to ensure better conditions of use of spectacles.

In the constructional solution illustrated in FIG. 7, the shaft 11 and the end A ensure a maximum splayed position which is well-defined and in any case such that it prevents overcoming of the contact between the end part 2 and the diagonal of the two adjacent sides 13a, 13b of the insert 13, thus avoiding reactions in the opposite direction to that of closing of the shaft With reference to FIG. 8 it is equally clear that, in order to reach its closed position on the front frame C, the shaft 11 must be able to change over from one to the other the sides 13a, 13b of the insert 13 making contact with the frame section 2 and, during this change-over, the corner 13c defined by the two adjacent sides 13a, 13b causes splaying of the pin 4, owing to the effect of the passing movement of the diagonal of the two said sides of the insert 13. This thus ensures snap-action closing of the shaft.

It is obvious that an identical result is achieved even if the insert has only two sides perpendicular to one another, these sides being those which are intended to make contact in succession with the side 2 of the end A.

Obviously, in the case of a different embodiment of the end A of the frame C, it is possible to provide the eyelet 12 with a different shape, so as to ensure in any case the desired splaying of the shaft 11.

Other similar modifications or adaptations both of the insert and of the frame are understood in any case as falling within the protective scope of the invention as defined by the claims which follow.

In particular, the eyelet of the shaft 11 may be inserted elastically into a perimetral seat 13f of the insert 13 (FIG. 9a). Alternatively, the end of the shaft may be straight and inserted into a corresponding hole 13g (FIG. 9b) of the insert 13.

In this case it is nevertheless possible to provide the insert 13 with the perimetral seat 13f into which a small ring 112 is inserted, being designed to interfere with the section 2 of the end A so as to prevent the shaft from disengaging from the pin 4.

In a further applicational embodiment, the seat 13f may be arranged so as to come into contact with the section 2 of the end A in order to engage with therewith and prevent the aforementioned disengagement.

In all cases the shaft may be soldered to the insert.

I claim:

1. A hinge for connecting an eyeglass front frame to a temple shaft, the hinge comprising:

an elastically deformable wire having a pair of arms extending at an acute angle to each other from an apex, one of the arms having an outer end fixed to the front frame and the other of the arms having an outer end bent to form a pivot pin extending crosswise to and adjacent the one arm; and a cam element fixed on the temple shaft pivoted on the pivot pin, the cam element having a pair of generally perpendicular surfaces engageable with the one arm and forming a pair of corners, one of the surfaces lying flatly against the one arm in a closed position with the temple extending generally parallel to the front frame and the other of the surfaces lying flatly against the one arm in an open position with the temple extending transversely from the front frame, the corners camming the two arms elastically apart on displacement from the open and closed positions.

2. The hinge defined in claim 1 wherein the cam element is formed with an axial hole fitting over the pivot pin.

3. The hinge defined in claim 1 wherein the cam element is formed with a peripheral groove in which rides the one arm.

4. The hinge defined in claim 1 wherein the cam is formed with a crosswise hole in which is fitted an end of the temple shaft.

5. The hinge defined in claim 1 wherein the temple shaft has an end wrapped around the cam element.

6. The hinge defined in claim 5 wherein the shaft is straight.

7. The hinge defined in claim 1 wherein the shaft is soldered to the cam element.

8. The hinge defined in claim 1 wherein the cam element is of polygonal section.

9. The hinge defined in claim 1 wherein the cam element is of quadrilateral section.

10. The hinge defined in claim 1 wherein the cam element is of square section.

* * * * *